United States Patent
Dai et al.

(10) Patent No.: US 12,431,795 B2
(45) Date of Patent: Sep. 30, 2025

(54) NON-ISOLATED LLC RESONANT CONVERTER

(71) Applicant: JND ELECTRONIC TECHNOLOGY (SHANGHAI) CO., LTD., Shanghai (CN)

(72) Inventors: Chonghui Dai, Shanghai (CN); Qiang Li, Shanghai (CN); Yu Zhang, Shanghai (CN)

(73) Assignee: JND ELECTRONIC TECHNOLOGY (SHANGHAI) CO., LTD., Shanghai (CN)

( * ) Notice: Subject to any disclaimer, the term of this patent is extended or adjusted under 35 U.S.C. 154(b) by 195 days.

(21) Appl. No.: 18/538,083

(22) Filed: Dec. 13, 2023

(65) Prior Publication Data

US 2025/0023462 A1 Jan. 16, 2025

(30) Foreign Application Priority Data

Jul. 13, 2023 (CN) .......................... 202310857400.3

(51) Int. Cl.
*H02M 3/00* (2006.01)
*H02M 1/00* (2006.01)

(52) U.S. Cl.
CPC ......... *H02M 3/015* (2021.05); *H02M 1/0058* (2021.05); *H02M 3/003* (2021.05)

(58) Field of Classification Search
CPC ..... H02M 3/015; H02M 3/003; H02M 1/0058
See application file for complete search history.

(56) References Cited

U.S. PATENT DOCUMENTS

| | | | |
|---|---|---|---|
| 11,515,790 B2* | 11/2022 | Ye .......................... | H02M 3/07 |
| 11,594,972 B2* | 2/2023 | Colonna ........... | H02M 3/33576 |
| 11,632,042 B2* | 4/2023 | Ye ........................... | H02M 3/07 |
| | | | 363/127 |
| 11,784,560 B2* | 10/2023 | Jin ...................... | H02M 3/1584 |
| | | | 363/118 |
| 12,113,447 B2* | 10/2024 | Lee ......................... | H02M 3/01 |

FOREIGN PATENT DOCUMENTS

| CN | 104685752 A | 6/2015 |
|---|---|---|
| CN | 105207487 A | 12/2015 |
| CN | 216016437 A | 3/2022 |

* cited by examiner

*Primary Examiner* — Adolf D Berhane
(74) *Attorney, Agent, or Firm* — George D. Morgan (57) ABSTRACT

The present disclosure discloses a non-isolated LLC resonant converter, comprising a first switch network module, a second switch network module, a resonance network module, a transformer module, a rectification network module and an output module, wherein via signals under drive control input on the first switch network module, the second switch network module and the rectification network module, it is controlled to realize zero-voltage switching (ZVS) and zero-current switching (ZCS) of a switch in a resonant state, thereby reducing switching loss of a switch unit, improving electric energy conversion efficiency and reducing production cost and power density, wherein simultaneously a quantity of turns of a primary winding of a transformer is saved, a loss of the primary winding of the transformer is reduced, a manufacturing cost of the power converter is reduced, simultaneously, a space of a transformer winding is saved, and design requirements of smaller volume are realized.

10 Claims, 4 Drawing Sheets

NON-ISOLATED LLC RESONANT CONVERTER

CROSS-REFERENCE TO RELATED APPLICATIONS

The application claims priority to Chinese patent application No. 202310857400.3, filed on Jul. 13, 2023, the entire contents of which are incorporated herein by reference.

TECHNICAL FIELD

The present disclosure is in the field of power supplies, and particularly relates to a non-isolated LLC resonant converter.

BACKGROUND

Figure 1:
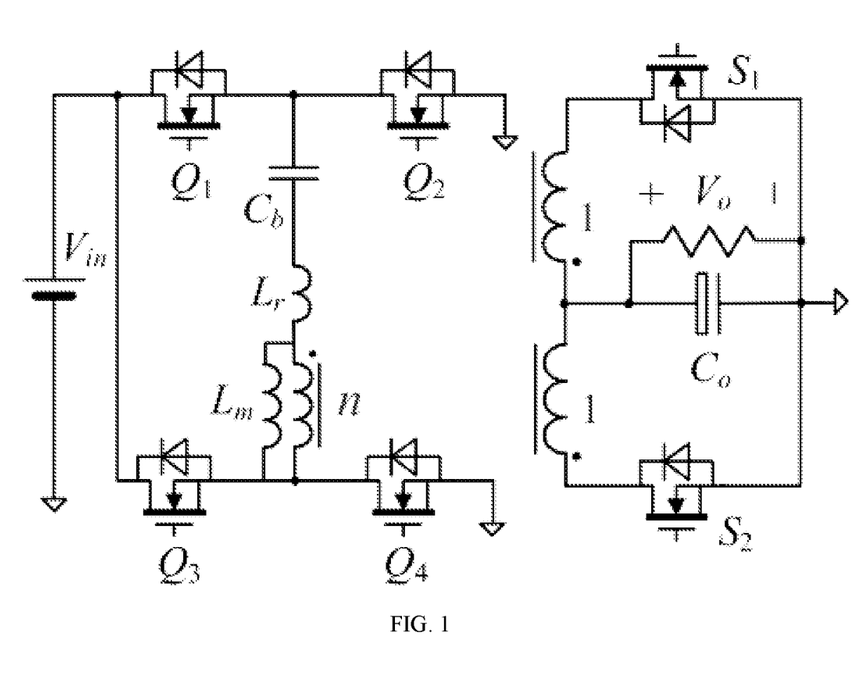
FIG. 1 is a schematic diagram of a circuit topology of an isolated full-bridge LLC resonant converter in prior art.

Since the isolated LLC resonant converter has the characteristic of zero current switching (ZCS) with the secondary winding, it can greatly reduce the switching loss of the switching tube and improve the power density of the converter, so it is widely used in applications requiring high power and small volume such as server and data center power supply. As shown in FIG. 1, a schematic diagram of a circuit topology of the isolated full-bridge LLC resonant converter in the prior art is shown.

Non-isolated converters can save isolation transformers and have advantages over isolated converters in terms of relative cost, since the primary and secondary windings will not need to be electrically isolated. However, the most commonly used non-isolated converter topology is a hard-switching structure, and a zero voltage switching (ZVS) rate density of the primary winding is lower than that of a soft-switching topology.

With the rapid development of artificial intelligence, large data and other information technology, there is a new demand for non-isolated converters. It is required that the converters can provide higher conversion efficiency, smaller size and cost advantages.

SUMMARY

In order to solve the above-mentioned problems, the present disclosure provides a non-isolated LLC resonant converter for solving the problem of low power density of existing non-isolated converters, and simultaneously, compared with an isolated LLC resonant converter, a quantity of primary winding turns is reduced, transformer losses are saved and transformer costs are lowered.

The present disclosure provides a non-isolated LLC resonant converter, including a first switch network module, a second switch network module, a resonance network module, a transformer module, a rectification network module and an output module, wherein the first switch network module and the second switch network module are connected to a power supply, a resonant network module, a transformer module and a rectification network module simultaneously for communicating with each module;

the transformer module, the rectification network module and the output module are connected;

the first switch network module includes a first switch and a second switch; the second switch network module includes a third switch and a fourth switch;

a first end of the first switch is connected to a positive electrode of the power supply, and a second end of the first switch is connected to a first end of the second switch and one end of the resonance network module simultaneously;

a second end of the second switch is connected to the transformer module and the rectification network module simultaneously;

a first end of the third switch is connected to the positive electrode of the power supply, and a second end of the third switch is connected to the other end of the resonance network module and a first end of the fourth switch simultaneously;

a second end of the fourth switch is connected to the transformer module and the rectification network module simultaneously;

the resonance network module includes an excitation inductance, a resonance inductance and a resonance capacitance;

one end of the resonance capacitance is connected to the first switch network module, the other end of the resonance capacitance is connected to one end of the excitation inductance, the other end of the excitation inductance is connected to one end of the resonance inductance, and the other end of the resonance inductance is connected to the second switch network module;

the transformer module includes a primary winding, a first secondary winding, a second secondary winding, a third secondary winding and a fourth secondary winding;

the primary winding is connected in parallel to the excitation inductance, a same-name end of the first secondary winding is connected to the first switch network module and the rectification network module simultaneously, a different-name end of the first secondary winding is connected to a same-name end of the second secondary winding, a same-name end of the third secondary winding, a different-name end of the fourth secondary winding and the output module simultaneously;

a different-name end of the second secondary winding is connected to the second switch network module and the rectification network module simultaneously, a different-name end of the third secondary winding is connected to the rectification network module, and a same-name end of the fourth secondary winding is connected to the rectification network module;

the rectification network module includes a fifth switch, a sixth switch, a seventh switch and an eighth switch;

a first end of the fifth switch is connected to the same-name end of the first secondary winding, and a second end of the fifth switch is connected to a negative electrode of the power supply;

a first end of the sixth switch is connected to the different-name end of the third secondary winding, and a second end of the sixth switch is connected to the negative electrode of the power supply;

a first end of the seventh switch is connected to the same-name end of the fourth secondary winding, and a second end of the seventh switch is connected to the negative electrode of the power supply;

a first end of the eighth switch is connected to the different-name end of the second secondary winding, and a second end of the eighth switch is connected to the negative electrode of the power supply;

the output module includes an output capacitance and a load resistance;

one end of the output capacitance is connected to the different-name end of the first secondary winding, and the other end of the output capacitance is connected to the negative electrode of the power supply; and one end of the load resistance is connected to the different-name end of the first secondary winding, and the other end of the load resistance is connected to the negative electrode of the power supply.

As a preferred implementation, the converter includes an input capacitance, one end of the input capacitance being connected to the positive electrode of the power supply and the other end being connected to the negative electrode of the power supply.

As a preferred implementation, the first switch, the second switch, the third switch and the fourth switch are controllable switching devices; and the first switch, the second switch, the third switch and the fourth switch are a metal-oxide-semiconductor field effect transistor, an insulated gate bipolar transistor, a gallium nitride transistor, a silicon carbide MOS transistor or a first combined switch unit, and the first combined switch unit is a combined switch of a triode and a diode.

As a preferred implementation, the fifth switch, the sixth switch, the seventh switch and the eighth switch are controllable switching devices or uncontrollable switching devices.

As a preferred implementation, the fifth switch, the sixth switch, the seventh switch and the eighth switch are a metal-oxide-semiconductor field effect transistor, an insulated gate bipolar transistor, a gallium nitride transistor, a silicon carbide MOS transistor, a diode, a first combined switch unit or a second combined switch unit; and the first combined switch unit is a combined switch of a triode and a diode, and the second combined switch unit is a combined switch of a diode and any one of a metal-oxide-semiconductor field effect transistor, an insulated gate bipolar transistor, a gallium nitride transistor and a silicon carbide MOS transistor.

As a preferred implementation, a resonance frequency of the resonance network module is:

$$fr = \frac{1}{\pi\sqrt{LrCr}},$$

wherein Lr represents an inductance value of the resonance inductance and Cr represents a capacitance value of the resonance capacitance.

As a preferred implementation, a setting range of a switch frequency of switches in the first switch network module, the second switch network module and the rectification network module are: $0.5*fr \leq fs \leq 2*fr$.

As a preferred implementation, the switch frequency of switches in the first switch network module, the second switch network module and the rectification network module are set to: fs=fr.

As a preferred implementation, the first secondary winding, the second secondary winding, the third secondary winding and the fourth secondary winding have the same quantity of winding turns.

As a preferred implementation, when the non-isolated LLC resonant converter is operated in a resonant state, during one resonance cycle, a drive control signal PWM1 is input on the first switch, the fourth switch, the fifth switch, and the seventh switch, and a drive control signal PWM2 is input on the second switch, the third switch, the sixth switch, and the eighth switch, the drive control signal PWM1 and the drive control signal PWM2 are complementary and both have a duty ratio of 50%, and a dead time is set between the drive control signal PWM1 and the drive control signal PWM2.

Compared with the prior art, prominent merits and advantageous effects of the present disclosure are as follows:

The non-isolated LLC resonant converter of the present disclosure can realize zero-voltage switching (ZVS) and zero-current switching (ZCS) of the switching unit in the resonant state, thereby reducing the switching loss of the switching unit, improving the power conversion efficiency, and reducing the production cost and power density.

The non-isolated LLC resonant converter of the present disclosure reduces the winding turn ratio of the transformer from n:1 to (n−2):1, the quantity of turns of the primary winding of the transformer is saved, the loss of the primary winding of the transformer is reduced, the manufacturing cost of the converter of the power supply is reduced, the space of the winding of the transformer is saved, and the design requirement of smaller volume is realized.

Additional features and advantages of the present disclosure will be set forth in the description which follows, and in part will be apparent from the description, or may be learned by practice of the present disclosure. The objectives and other advantages of the present disclosure may be realized and attained by the structure particularly pointed out in the written description and claims hereof as well as the appended drawings.

BRIEF DESCRIPTION OF DRAWINGS

The accompanying drawings are only for the purpose of illustrating specific embodiments and are not considered a limitation of the present disclosure. Throughout the drawings, the same reference symbols represent the same components.

101, first switch network module; 102, second switch network module; 103, resonance network module; 104, transformer module; 105, rectification network module; Co, output capacitance; Ro, load resistance; Cin, input capacitance; Q1, first switch; Q2, second switch; Q3, third switch; Q4, fourth switch; Lr, resonance inductance; Cr, resonance capacitance; Lm, excitation inductance; Np, primary winding; Ns1_1, first secondary winding; Ns2_1, second secondary winding; Ns2_2, third secondary winding; Ns1_2, fourth secondary winding; SR1, fifth switch; SR2, sixth switch; SR3, seventh switch; SR4, eighth switch; D1, first diode; D2, second diode; D3, third diode; and D4, fourth diode.

DETAILED DESCRIPTION OF THE EMBODIMENTS

It will be readily understood that, according to the technical solutions of the present disclosure, various implementations of the present disclosure can be devised by those skilled in the art without departing from the substantial spirit of the present disclosure. Accordingly, the following detailed description and drawings are merely exemplary illustrations of the technical solutions of the present disclosure and are not to be construed as an exhaustive or limiting or restrictive aspect of the technical solutions of the present disclosure. Rather, these embodiments are provided so that those skilled in the art may more fully understand the present disclosure. Preferred embodiments of the present disclosure will now be described in detail in combination with the drawings, which form a part of the present application and illustrate the creative idea of the present disclosure together with the embodiments of the present disclosure.

Embodiment 1

Figure 2:
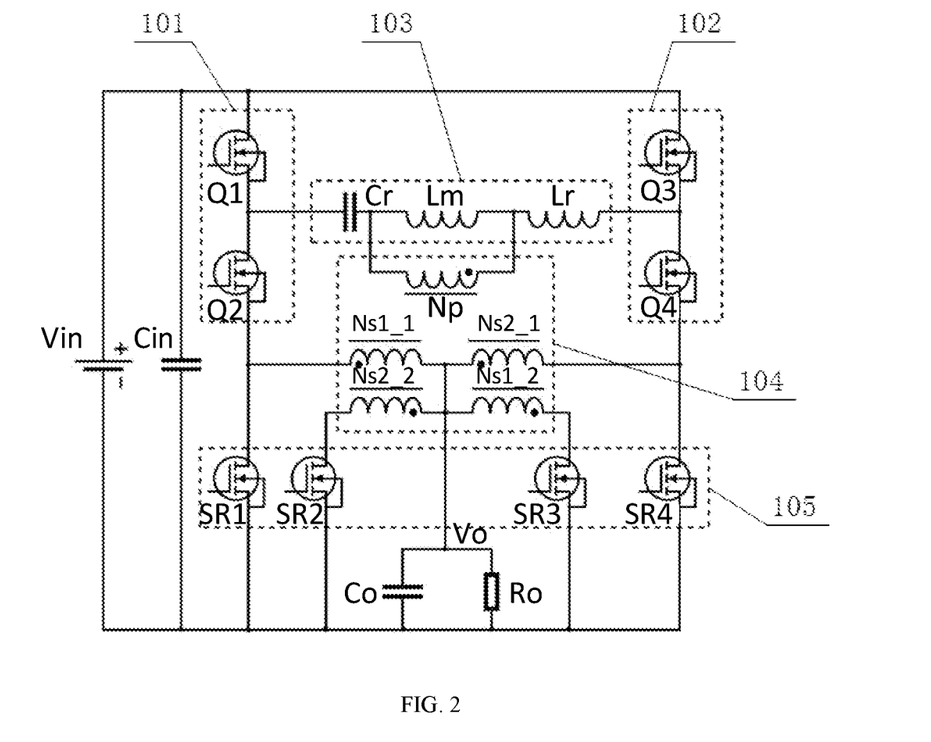
FIG. 2 is a schematic diagram of a circuit topology of a non-isolated LLC resonant converter of embodiment 1 of the present disclosure.

As shown in FIG. 2, a non-isolated LLC resonant converter includes a first switch network module 101, a second switch network module 102, a resonance network module 103, a transformer module 104, a rectification network module 105 and an output module;

the first switch network module 101 and the second switch network module 102 are connected to a power supply, a resonant network module 103, a transformer module 104 and a rectification network module 105 simultaneously for communicating with each module; and the transformer module 104, the rectification network module 105 and the output module are connected.

The first switch network module 101 is configured for connecting one end of the resonance network module 103 to a positive electrode of a power supply and a same-name end of a first secondary winding Ns1_1 of the transformer module 104, and the second switch network module 102 is configured for connecting the other end of the resonance network module 103 to the positive electrode of the power supply and a different-name end of the second secondary winding Ns2_1 of the transformer module 104;

the resonance network module 103 is configured for achieving zero-voltage switching (ZVS) of the first switch network module 101 and the second switch network module 102;

the transformer module 104 is configured for coupling voltage and current on a primary winding Np to a first secondary winding Ns1_1, a second secondary winding Ns2_1, a third secondary winding Ns2_2 and a fourth secondary winding Ns1_2; and the rectification network module 105 is configured for realizing zero-current switching (ZCS), realizing that the first secondary winding Ns1_1, the fourth secondary winding Ns1_2, the load resistance Ro and the output capacitance Co are connected in parallel and then connected in series with the second secondary winding Ns2_1, or realizing that the second secondary winding Ns2_1, the third secondary winding Ns2_2, the load resistance Ro and the output capacitance Co are connected in parallel and then connected in series with the first secondary winding Ns1_1, and the output capacitance Co is configured for output filtering.

The first switch network module 101 includes a first switch Q1 and a second switch Q2; the second switch network module 102 includes a third switch Q3 and a fourth switch Q4;

the first switch Q1, the second switch Q2, the third switch Q3 and the fourth switch Q4 are controllable switching devices, which can adopt a metal-oxide-semiconductor field effect transistor, an insulated gate bipolar transistor, a gallium nitride transistor, a silicon carbide MOS transistor or a first combined switch unit, wherein the first combined switch unit is a combined switch of a triode and a diode, while in the present embodiment, the first switch Q1, the second switch Q2, the third switch Q3 and the fourth switch Q4 adopt the MOS transistor; and a drain electrode of the first switch Q1 is connected to the positive electrode of the power supply, and a source electrode of the first switch Q1 is simultaneously connected to a drain electrode of the second switch Q2 and one end of the resonance network module 103 (namely, the resonance capacitance Cr);

a source electrode of the second switch Q2 is connected to the transformer module 104 and the fifth switch SR1 in the rectification network module 105 simultaneously;

a drain electrode of the third switch Q3 is connected to the positive electrode of the power supply, and a source electrode of the third switch Q3 is connected to the other end of the resonance network module 103 (namely, the resonance inductance Lr) and a drain electrode of the fourth switch Q4 simultaneously;

a source electrode of the fourth switch Q4 is connected to the second secondary winding Ns2_1 of the transformer module 104 and the eighth switch SR4 of the rectification network module 105 simultaneously;

the resonance network module 103 includes an excitation inductance Lm, a resonance inductance Lr and a resonance capacitance Cr; and one end of the resonance capacitance Cr is connected to the source electrode of the first switch Q1 of the first switch network module 101, the other end of the resonance capacitance Cr is connected to one end of the excitation inductance Lm, the other end of the excitation inductance Lm is connected to one end of the resonance inductance Lr, the other end of the resonance inductance Lr is connected to the second switch network module 102, the resonance capacitance Cr in the resonance network module 103 is a common capacitance, and the function thereof is a resonance function, while in addition the resonance inductance Lr here can be an independent inductance or a leakage inductance of a transformer is directly used.

The transformer module 104 includes a primary winding Np, a first secondary winding Ns1_1, a second secondary winding Ns2_1, a third secondary winding Ns2_2 and a fourth secondary winding Ns1_2, wherein a quantity of turns of the first secondary winding Ns1_1, the second secondary winding Ns2_1, the third secondary winding Ns2_2 and the fourth secondary winding Ns1_2 are all the same, and a ratio of the quantity of turns of the primary winding Np to that of the secondary winding is N:1;

the primary winding Np and the excitation inductance Lm are connected in parallel, and it should be noted here that the excitation inductance Lm in the present embodiment belongs to the inductance of the primary winding Np;

specifically, the same-name end of the first secondary winding Ns1_1 is connected to the source electrode of the second switch Q2 of the first switch network module 101 and a drain electrode of the fifth switch SR1 of the rectification network module 105 simultaneously, and the different-name end of the first secondary winding Ns1_1 is connected to a same-name end of the second secondary winding Ns2_1, a same-name end of the third secondary winding Ns2_2, a different-name end of the fourth secondary winding Ns1_2 and the output module simultaneously; and the different-name end of the second secondary winding Ns2_1 is connected to the source electrode of the fourth switch Q4 of the second switch network module 102 and a drain electrode of the eighth switch SR4 of the rectification network module 105 simultaneously, the different-name end of the third secondary winding Ns2_2 is connected to a drain electrode of the fifth switch SR2 of the rectification network module 105, and the same-name end of the fourth secondary winding Ns1_2 is connected to a drain electrode of the seventh switch SR3 of the rectification network module 105.

The rectification network module 105 includes a fifth switch SR1, a sixth switch SR2, a seventh switch SR3 and an eighth switch SR4, wherein the fifth switch SR1, the sixth switch SR2, the seventh switch SR3 and the eighth switch SR4 are controllable switching devices or uncontrollable switching devices, namely, one of a metal-oxide-semiconductor field effect transistor, an insulated gate bipolar transistor, a gallium nitride transistor and a silicon carbide MOS transistor, a diode, a first combined switch unit or a second combined switch unit can be adopted:

the first combined switch unit is a combined switch of a triode and a diode, and the second combined switch unit is a combined switch of a diode and any one of a metal-oxide-semiconductor field effect transistor, an insulated gate bipolar transistor, a gallium nitride transistor and a silicon carbide MOS transistor;

in the present embodiment, the fifth switch SR1, the sixth switch SR2, the seventh switch SR3 and the eighth switch SR4 adopt a MOS transistor; and a first end of the fifth switch SR1 is connected to the same-name end of the first secondary winding Ns1_1, and a second end of the fifth switch SR1 is connected to the negative electrode of the power supply; a first end of the sixth switch SR2 is connected to the different-name end of the third secondary winding Ns2_2, and a second end of the sixth switch SR2 is connected to the negative electrode of the power supply; a first end of the seventh switch SR3 is connected to the same-name end of the fourth secondary winding Ns1_2, and a second end of the seventh switch SR3 is connected to the negative electrode of the power supply; and a first end of the eighth switch SR4 is connected to the different-name end of the second secondary winding Ns2_1, and a second end of the eighth switch SR8 is connected to the negative electrode of the power supply.

The output module includes an output capacitance Co and a load resistance Ro, wherein one end of the output capacitance Co is connected to the different-name end of the first secondary winding Ns1_1, and the other end of the output capacitance Co is connected to the negative electrode of the power supply; and one end of the load resistance Ro is connected to the different-name end of the first secondary winding Ns1_1, and the other end of the load resistance Ro is connected to the negative electrode of the power supply; and The converter further includes an input capacitance Cin, one end of the input capacitance Cin being connected to the positive electrode of the power supply and the other end being connected to the negative electrode of the power supply.

A resonance frequency of the resonance network module 103 is:

$$fr = \frac{1}{2\pi\sqrt{LrCr}},$$

wherein Lr represents an inductance value of the resonance inductance Lr, and Cr represents a capacitance value of the resonance capacitance Cr, and simultaneously, a setting range of a switch frequency of switches in the first switch network module 101, the second switch network module 102 and the rectification network module 105 is: 0.5*fr≤fs≤2*fr, while, preferably, when the switch frequencies of the switches in the first switch network module 101, the second switch network module 102 and the rectification network module 105 are set as fs=fr, the resonant converter operates best.

When the non-isolated LLC resonant converter operates in a resonant state, during one resonance cycle, a drive control signal PWM1 is input on the first switch Q1, the fourth switch Q4, the fifth switch SR1 and the seventh switch SR3, and a drive control signal PWM2 is input on the second switch Q2, the third switch Q3, the sixth switch SR2 and the eighth switch SR4, wherein the drive control signal PWM1 and the drive control signal PWM2 are complementary, and the duty ratios thereof are both 50%, a dead time is set between the drive control signal PWM1 and the drive control signal PWM2, a resonance current flowing through the resonance capacitance Cr is Icr, an excitation current flowing through the excitation inductance Lm is Im, a current on the first secondary winding Ns1_1 is Is1_1, a current on the second secondary winding Ns2_1 is Is2_1, a current on the fourth secondary winding Ns1_2 is Is1_2, and a current on the third secondary winding Ns2_2 is Is2_2.

Under control of complementary drive control signals PWM1 and PWM2, first;

the first switch Q1 and the fourth switch Q4 are turned on simultaneously, the second switch Q2 and the third switch Q3 are turned off simultaneously, the fifth switch SR1 and the seventh switch SR3 are turned on and rectified, and the sixth switch SR2 and the eighth switch SR4 are cut off, and, at this moment, the second secondary winding Ns2_1, the first secondary winding Ns1_1 and the fourth secondary winding Ns1_2 together provide a current for the load Ro;

then, when the second switch Q2 and the third switch Q3 are turned on, the first switch Q1 and the fourth switch Q4 are turned off, the sixth switch SR2 and the eighth switch unit SR4 are turned on and rectified, the fifth switch SR1 and the seventh switch SR3 are cut off, and the first secondary winding Ns1_1, the second secondary winding Ns2_1 and the third secondary winding Ns2_2 together provide a current for the load Ro.

Figure 3:
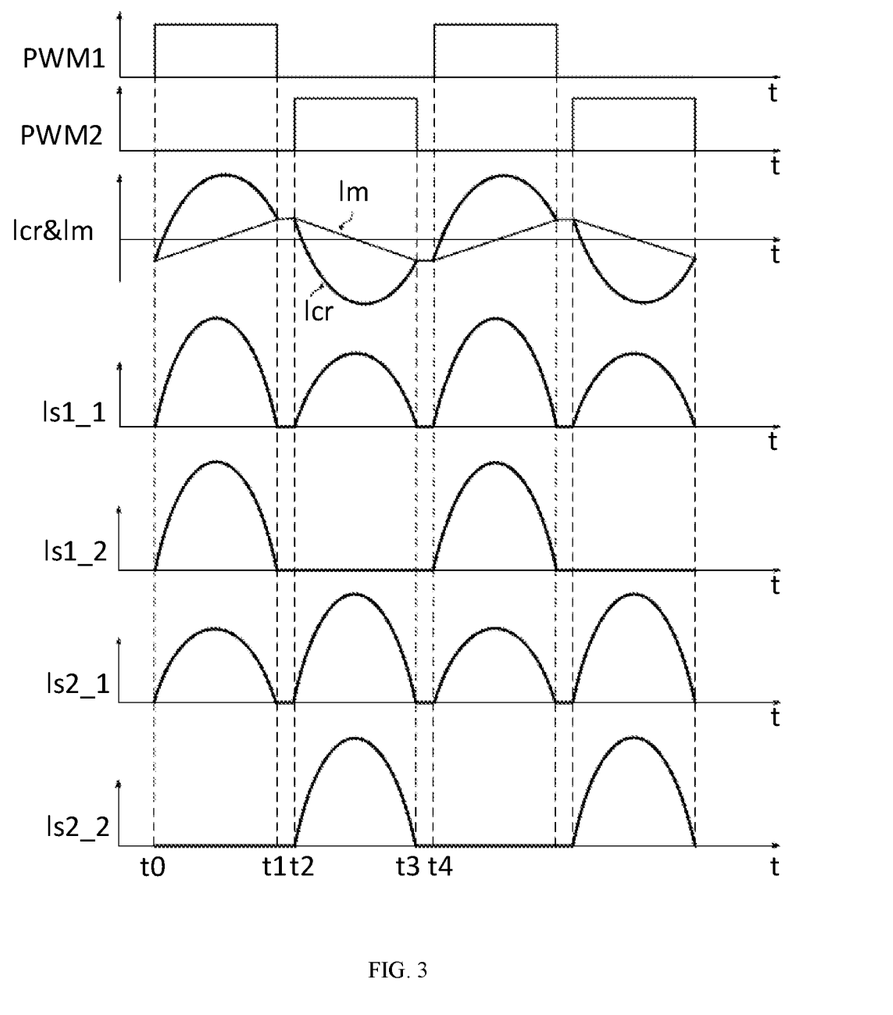
FIG. 3 is a schematic diagram of a time sequence of a non-isolated LLC resonant converter operating at a resonant state in an embodiment of the present disclosure.

Specifically, with reference to FIG. 3, a chart of a time sequence of the resonant converter of the present embodiment when operating in the resonant state (fs=fr) is shown:

in time t0-t1, the PWM1 signal is high, the PWM2 signal is low, the first switch Q1, the fourth switch Q4, the fifth switch SR1 and the seventh switch SR3 are turned on, the second switch Q2, the third switch Q3, the sixth switch SR2 and the eighth switch SR4 are turned off, the resonance capacitance Cr and the resonance inductance Lr generate a resonance current Icr, and a direction of the resonance current Icr is to flow through the resonance network module 103 to the fourth switch Q4 via the first switch Q1, and to provide a current to the load Ro after flowing through the second secondary winding Ns2_1; simultaneously, the corresponding excitation current Im excites the transformer module 104, the current passing through the primary winding Np is Inp=Icr−Im, and after the current is coupled to the first secondary winding Ns1_1 and the fourth secondary winding Ns1_2, output currents are Is1_1 and Is1_2, which together provide a current for the load Ro.

The dead time is from t1 to t2, and at the moment t1, the resonance current Icr is equal to the excitation current Im, and at this time, both the PWM1 signal and the PWM2 signal are low, and continue until t2; the resonance current Icr is equal to the excitation current Im in the dead time, the transformer module 104 does not transfer energy, the output currents of the first secondary winding Ns1_1, the fourth secondary winding Ns1_2, the second secondary winding Ns2_1 and the third secondary winding Ns2_2 are all 0, and the fifth switch SR1 and the seventh switch SR3 achieve zero-current switching (ZCS).

Simultaneously, within the moments of the dead time t1 to t2, the excitation current Im can simultaneously charge a junction capacitance of the first switch Q1 and the fourth switch Q4, and discharge a junction capacitance of the second switch Q2 and the third switch Q3, so that the voltage between the drain electrode and the source electrode of the second switch Q2 and the third switch Q3 is zero, thereby achieving zero-voltage switching (ZVS) of the second switch Q2 and the third switch Q3.

Within time t2-t3, the PWM1 signal is low, the PWM2 signal is high, the first switch Q1, the fourth switch Q4, the fifth switch SR1 and the seventh switch SR3 are turned off, the second switch Q2, the third switch Q3, the sixth switch SR2 and the eighth switch SR4 are turned on, the resonance capacitance Cr and the resonance inductance Lr generate the resonance current Icr, and a direction of the resonance current Icr is to flow through the resonance network module 103 to the second switch Q2 via the third switch Q3, and to flow through the first secondary winding Ns1_1 and provide a current to the load Ro; simultaneously, the excitation current Im excites the transformer module 104, the current passing through the primary winding Np is Inp=Icr−Im, and after being coupled to the second secondary winding Ns2_1 and the third secondary winding Ns2_2, the output currents are Is2_1 and Is2_2, which together provide a current for the load Ro.

The dead time is from t3 to t4, and at the moment t3, the resonance current Icr is equal to the excitation current Im, and at this time, both the PWM1 signal and the PWM2 signal are low, and continue until t4; the resonance current Icr is equal to the excitation current Im in the dead time, the transformer module 104 does not transfer energy, the output currents of the first secondary winding Ns1_1, the fourth secondary winding Ns1_2, the second secondary winding Ns2_1 and the third secondary winding Ns2_2 are all 0, and the sixth switch SR2 and the eighth switch SR3 achieve zero-current switching (ZCS).

Simultaneously, within the moments of the dead time t3 to t4, the excitation current Im can simultaneously discharge a junction capacitance of the first switch Q1 and the fourth switch Q4, and charge a junction capacitance of the second switch Q2 and the third switch Q3, thereby achieving zero-voltage switching (ZVS) of the first switch Q1 and the fourth switch Q4.

At moment t4, the PWM1 signal is high, the PWM2 signal is low, the first switch Q1, the fourth switch Q4, the fifth switch SR1 and the seventh switch SR3 are turned on, the second switch Q2, the third switch Q3, the sixth switch SR2 and the eighth switch SR4 are turned off, and the non-isolated LLC resonant converter enters the next operating cycle.

It can be seen that the non-isolated LLC resonant converter of the present disclosure can realize zero-voltage switching (ZVS) and zero-current switching (ZCS) of the switching unit in the resonant state, thereby reducing the switching loss of the switching unit, improving the power conversion efficiency, and reducing the production cost and power density.

On the other hand, assuming that the input voltage at both ends of the LLC resonant converter in the present embodiment is Vin, a ratio of the quantity of turns of the primary winding to the secondary winding in the transformer module 104 is N:1, and the output voltage is Vo, for the existing isolated full-bridge LLC resonant converter, the quantity of turns of the primary winding of the transformer required is N1=Vin/Vo.

However, with regard to the non-isolated LLC resonant converter in the present embodiment, the voltage at the two ends of the resonance network module 103 is Vin−2*Vo, and the required quantity of turns of the primary winding Np of the transformer module 104 is N2=(Vin−2*Vo)/Vo=N1−2, that is to say, compared with the isolated full-bridge LLC resonant converter, the non-isolated LLC resonant converter in the present embodiment can reduce two turns of the primary winding of the transformer, thereby reducing the loss of the primary winding of the transformer and reducing the manufacturing cost of the power converter; simultaneously, the transformer winding space is saved, and the design requirement of a smaller volume is realized.

Embodiment 2

Figure 4:
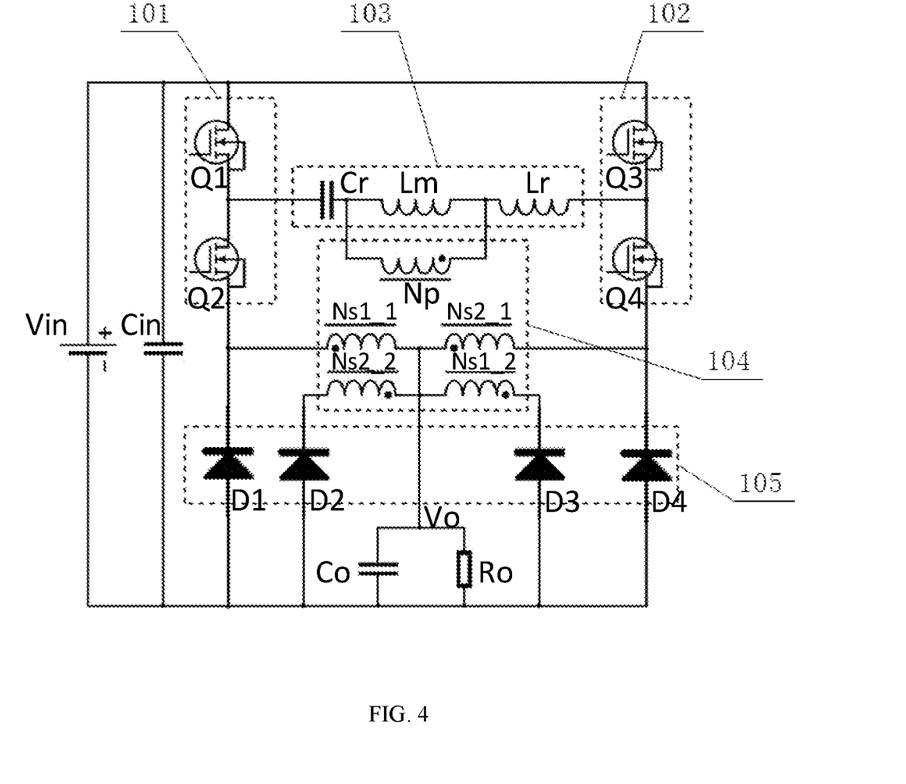
FIG. 4 is a schematic diagram of a circuit topology of a non-isolated LLC resonant converter of embodiment 2 of the present disclosure.

As shown in FIG. 4, which is another preferred embodiment of the non-isolated LLC resonant converter of the present disclosure, different from embodiment 1, the fifth switch SR1, the sixth switch SR2, the seventh switch SR3 and the eighth switch SR4 in the rectification network module 105 adopt diodes in an uncontrollable switching device, namely, a first diode D1, a second diode D2, a third diode D3 and a fourth diode D4; and a cathode of the first diode D1 is connected to the source electrode of the second switch Q2 and the same-name end of the first secondary winding Ns1_1, a cathode of the second diode D2 is connected to the different-name end of the third secondary winding Ns2_2, a cathode of the third diode D3 is connected to the same-name end of the fourth secondary winding Ns1_2, a cathode of the fourth diode D4 is connected to the source electrode of the fourth switch Q4 and the different-name end of the second secondary winding Ns2_1, and anodes of the first diode D1, the second diode D2, the third diode D3 and the fourth diode D4 are all connected to the negative electrode of the power supply.

A resonance frequency of the resonance network module 103 in the present disclosure is:

$$fr = \frac{1}{2\pi\sqrt{LrCr}},$$

wherein Lr represents an inductance value of the resonance inductance Lr, and Cr represents a capacitance value of the resonance capacitance Cr, and simultaneously, a setting range of a switch frequency of switches in the first switch network module 101, the second switch network module 102 and the rectification network module 105 is: $0.5*fr \leq fs \leq 2*fr$, while, preferably, when the switch frequencies of the switches in the first switch network module 101, the second switch network module 102 and the rectification network module 105 are set as fs=fr, the resonant converter operates best.

When the converter operates in a resonant state, during one resonance cycle, a drive control signal PWM1 is input on the first switch Q1, the fourth switch Q4, the first diode D1 and the third diode D3, and a drive control signal PWM2 is input on the second switch Q2, the third switch Q3, the second diode D2 and the fourth diode D4, wherein the drive control signal PWM1 and the drive control signal PWM2 are complementary, and the duty ratios thereof are both 50%, a dead time is set between the drive control signal PWM1 and the drive control signal PWM2, a resonance current flowing through the resonance capacitance Cr is Icr, an excitation current flowing through the excitation inductance Lm is Im, a current on the first secondary winding Ns1_1 is Is1_1, a current on the second secondary winding Ns2_1 is Is2_1, a current on the fourth secondary winding Ns1_2 is Is1_2, and a current on the third secondary winding Ns2_2 is Is2_2.

Under control of complementary drive control signals PWM1 and PWM2, first:
  the first switch Q1 and the fourth switch Q4 are turned on simultaneously, the second switch Q2 and the third switch Q3 are turned off simultaneously, the first diode D1 and the third diode D3 are turned on and rectified, and the second diode D2 and the fourth diode D4 are cut off, and, at this moment, the second secondary winding Ns2_1, the first secondary winding Ns1_1 and the fourth secondary winding Ns1_2 together provide a current for the load Ro;
  then, when the second switch Q2 and the third switch Q3 are turned on, the first switch Q1 and the fourth switch Q4 are turned off, the second diode D2 and the fourth diode D4 are turned on and rectified, the first diode D1 and the third diode D3 are cut off, and the first secondary winding Ns1_1, the second secondary winding Ns2_1 and the third secondary winding Ns2_2 together provide a current for the load Ro.

Specifically, with reference to FIG. 3, a chart of a time sequence of the resonant converter of the present embodiment when operating in the resonant state (fs=fr) is shown:
  in time t0-t1, the PWM1 signal is high, the PWM2 signal is low, the first switch Q1, the fourth switch Q4, the first diode D1 and the third diode D3 are turned on, the second switch Q2, the third switch Q3, the second diode D2 and the fourth diode D4 are turned off, the resonance capacitance Cr and the resonance inductance Lr generate a resonance current Icr, and a direction of the resonance current Icr is to flow through the resonance network module 103 to the fourth switch Q4 via the first switch Q1, and to provide a current to the load Ro after flowing through the second secondary winding Ns2_1; simultaneously, the corresponding excitation current Im excites the transformer module 104, the current passing through the primary winding Np is Inp=Icr−Im, and after the current is coupled to the first secondary winding Ns1_1 and the fourth secondary winding Ns1_2, output currents are Is1_1 and Is1_2, which together provide a current for the load Ro.

The dead time is from t1 to t2, and at the moment t1, the resonance current Icr is equal to the excitation current Im, and at this time, both the PWM1 signal and the PWM2 signal are low, and continue until t2; the resonance current Icr is equal to the excitation current Im in the dead time, the transformer module 104 does not transfer energy, the output currents of the first secondary winding Ns1_1, the fourth secondary winding Ns1_2, the second secondary winding Ns2_1 and the third secondary winding Ns2_2 are all 0, and the fifth switch SR1 and the seventh switch SR3 achieve zero-current switching (ZCS).

Simultaneously, within the moments of the dead time t1 to t2, the excitation current Im can simultaneously charge a junction capacitance of the first switch Q1 and the fourth switch Q4, and discharge a junction capacitance of the second switch Q2 and the third switch Q3, so that the voltage between the drain electrode and the source electrode of the second switch Q2 and the third switch Q3 is zero, thereby achieving zero-voltage switching (ZVS) of the second switch Q2 and the third switch Q3.

Within time t2-t3, the PWM1 signal is low, the PWM2 signal is high, the first switch Q1, the fourth switch Q4, the first diode D1 and the third diode D3 are turned off, the second switch Q2, the third switch Q3, the second diode D2 and the fourth diode D4 are turned on, the resonance capacitance Cr and the resonance inductance Lr generate the resonance current Icr, and a direction of the resonance current Icr is to flow through the resonance network module 103 to the second switch Q2 via the third switch Q3, and to flow through the first secondary winding Ns1_1 and provide a current to the load Ro; simultaneously, the excitation current Im excites the transformer module 104, the current passing through the primary winding Np is Inp=Icr−Im, and after being coupled to the second secondary winding Ns2_1 and the third secondary winding Ns2_2, the output currents are Is2_1 and Is2_2, which together provide a current for the load Ro.

The dead time is from t3 to t4, and at the moment t3, the resonance current Icr is equal to the excitation current Im, and at this time, both the PWM1 signal and the PWM2 signal are low, and continue until t4; the resonance current Icr is equal to the excitation current Im in the dead time, the transformer module 104 does not transfer energy, the output currents of the first secondary winding Ns1_1, the fourth secondary winding Ns1_2, the second secondary winding Ns2_1 and the third secondary winding Ns2_2 are all 0, and the first diode D1 and the fourth diode D4 achieve zero-current switching (ZCS).

Simultaneously, within the moments of the dead time t3 to t4, the excitation current Im can simultaneously discharge a junction capacitance of the first switch Q1 and the fourth switch Q4, and charge a junction capacitance of the second switch Q2 and the third switch Q3, thereby achieving zero-voltage switching (ZVS) of the first switch Q1 and the fourth switch Q4.

At moment t4, the PWM1 signal is high, the PWM2 signal is low, the first switch Q1, the fourth switch Q4, the first diode D1 and the third diode D3 are turned on, the second switch Q2, the third switch Q3, the second diode D2 and the fourth diode D4 are turned off, and the non-isolated LLC resonant converter enters the next operating cycle.

It can be seen that the non-isolated LLC resonant converter of the present disclosure can realize zero-voltage switching (ZVS) and zero-current switching (ZCS) of the switching unit in the resonant state, thereby reducing the switching loss of the switching unit, improving the power conversion efficiency, and reducing the production cost and power density.

On the other hand, assuming that the input voltage at both ends of the LLC resonant converter in the present embodiment is Vin, a ratio of the quantity of turns of the primary winding to the secondary winding in the transformer module 104 is N:1, and the output voltage is Vo, for the existing isolated full-bridge LLC resonant converter, the quantity of turns of the primary winding of the transformer required is N1=Vin/Vo.

However, with regard to the non-isolated LLC resonant converter in the present embodiment, the voltage at the two ends of the resonance network module 103 is Vin−2*Vo, and the required quantity of turns of the primary winding Np of the transformer module 104 is N2=(Vin−2*Vo)/Vo=N1−2, that is to say, compared with the isolated full-bridge LLC resonant converter, the non-isolated LLC resonant converter in the present embodiment can reduce two turns of the primary winding of the transformer, thereby reducing the loss of the primary winding of the transformer and reducing the manufacturing cost of the power converter; simultaneously, the transformer winding space is saved, and the design requirement of a smaller volume is realized.

The description is only a specific preferred implementation of the present disclosure, but the scope of protection of the present disclosure is not limited thereto, and any changes and substitutions which can be easily made by those skilled in the art within the technical scope of the present disclosure disclosed are within the scope of protection of the present disclosure.

It should be appreciated that in the foregoing description of exemplary embodiments of the present disclosure, various features of the present disclosure are sometimes described in or with reference to a single embodiment in order to streamline the present disclosure and assist those skilled in the art in understanding the various aspects of the present disclosure. However, the present disclosure should not be explained such that the features included in the exemplary embodiments are all essential features of the patent claims.

Those of ordinary skill in the art will appreciate that all or some of the proceedings to implement the method embodiments described above may be performed by instructing related hardwares via computer programs, while the programs may be stored in a computer readable storage medium. The computer readable storage medium is a magnetic disk, an optical disk, a read-only memory or a random access memory, etc.

It should be understood that modules, units, components, etc. included in an apparatus of an embodiment of the present disclosure may be adaptively changed to be provided in an apparatus different from the embodiment. Different modules, units or components comprised by the apparatus of an embodiment may be combined into one module, unit or component, or they may be divided into a plurality of sub-modules, sub-units or sub-components.

The modules, units or components in an embodiment of the present disclosure may be implemented in hardware, in software running on one or more processors, or in a combination thereof. Those skilled in the art will appreciate that a microprocessor or digital signal processor (DSP) may be used in practice to implement embodiments in accordance with the present disclosure. The present disclosure can also be embodied on a computer program product or computer readable medium for performing a part or all of the methods described herein.

What is claimed is:

1. A non-isolated LLC resonant converter, characterized by comprising a first switch network module (101), a second switch network module (102), a resonance network module (103), a transformer module (104), a rectification network module (105) and an output module, wherein the first switch network module (101) and the second switch network module (102) are connected to a power supply, the resonance network module (103), the transformer module (104) and the rectification network module (105) simultaneously for communicating with each module;

the transformer module (104), the rectification network module (105) and the output module are connected;

the first switch network module (101) comprises a first switch (Q1) and a second switch (Q2); the second switch network module (102) comprises a third switch (Q3) and a fourth switch (Q4);

a first end of the first switch (Q1) is connected to a positive electrode of the power supply, and a second end of the first switch (Q1) is connected to a first end of the second switch (Q2) and one end of the resonance network module (103) simultaneously;

a second end of the second switch (Q2) is connected to the transformer module (104) and the rectification network module (105) simultaneously;

a first end of the third switch (Q3) is connected to the positive electrode of the power supply, and a second end of the third switch (Q3) is connected to the other end of the resonance network module (103) and a first end of the fourth switch (Q4) simultaneously;

a second end of the fourth switch (Q4) is connected to the transformer module (104) and the rectification network module (105) simultaneously;

the resonance network module (103) comprises an excitation inductance (Lm), a resonance inductance (Lr) and a resonance capacitance (Cr);

one end of the resonance capacitance (Cr) is connected to the first switch network module (101), the other end of the resonance capacitance (Cr) is connected to one end of the excitation inductance (Lm), the other end of the excitation inductance (Lm) is connected to one end of the resonance inductance (Lr), and the other end of the resonance inductance (Lr) is connected to the second switch network module (102);

the transformer module (104) comprises a primary winding (Np), a first secondary winding (Ns1_1), a second secondary winding (Ns2_1), a third secondary winding (Ns2_2) and a fourth secondary winding (Ns1_2);

the primary winding (Np) is connected in parallel to the excitation inductance (Lm), a same-name end of the first secondary winding (Ns1_1) is connected to the first switch network module (101) and the rectification network module (105) simultaneously, a different-name end of the first secondary winding (Ns1_1) is connected to a same-name end of the second secondary winding (Ns2_1), a same-name end of the third secondary winding (Ns2_2), a different-name end of the fourth secondary winding (Ns1_2) and the output module simultaneously;

a different-name end of the second secondary winding (Ns2_1) is connected to the second switch network module (102) and the rectification network module (105) simultaneously, a different-name end of the third secondary winding (Ns2_2) is connected to the rectification network module (105), and a same-name end of the fourth secondary winding (Ns1_2) is connected to the rectification network module (105);

the rectification network module (105) comprises a fifth switch (SR1), a sixth switch (SR2), a seventh switch (SR3) and an eighth switch (SR4);

a first end of the fifth switch (SR1) is connected to the same-name end of the first secondary winding (Ns1_1), and a second end of the fifth switch (SR1) is connected to a negative electrode of the power supply;

a first end of the sixth switch (SR2) is connected to the different-name end of the third secondary winding (Ns2_2), and a second end of the sixth switch (SR2) is connected to the negative electrode of the power supply;

a first end of the seventh switch (SR3) is connected to the same-name end of the fourth secondary winding (Ns1_2), and a second end of the seventh switch (SR3) is connected to the negative electrode of the power supply;

a first end of the eighth switch (SR4) is connected to the different-name end of the second secondary winding (Ns2_1), and a second end of the eighth switch (SR8) is connected to the negative electrode of the power supply;

the output module comprises an output capacitance (Co) and a load resistance (Ro);

one end of the output capacitance (Co) is connected to the different-name end of the first secondary winding (Ns1_1), and the other end of the output capacitance (Co) is connected to the negative electrode of the power supply; and one end of the load resistance (Ro) is connected to the different-name end of the first secondary winding (Ns1_1), and the other end of the load resistance (Ro) is connected to the negative electrode of the power supply.

2. The non-isolated LLC resonant converter according to claim 1, characterized by further comprising an input capacitance (Cin), one end of the input capacitance (Cin) being connected to the positive electrode of the power supply and the other end being connected to the negative electrode of the power supply.

3. The non-isolated LLC resonant converter according to claim 1, characterized in that the first switch (Q1), the second switch (Q2), the third switch (Q3) and the fourth switch (Q4) are controllable switching devices; and the first switch (Q1), the second switch (Q2), the third switch (Q3) and the fourth switch (Q4) are a metal-oxide-semiconductor field effect transistor, an insulated gate bipolar transistor, a gallium nitride transistor, a silicon carbide MOS transistor or a first combined switch unit, and the first combined switch unit is a combined switch of a triode and a diode.

4. The non-isolated LLC resonant converter according to claim 1, characterized in that the fifth switch (SR1), the sixth switch (SR2), the seventh switch (SR3) and the eighth switch (SR8) are controllable switching devices or uncontrollable switching devices.

5. The non-isolated LLC resonant converter according to claim 1, characterized in that the fifth switch (SR1), the sixth switch (SR2), the seventh switch (SR3) and the eighth switch (SR8) are a metal-oxide-semiconductor field effect transistor, an insulated gate bipolar transistor, a gallium nitride transistor, a silicon carbide MOS transistor, a diode, a first combined switch unit or a second combined switch unit; and the first combined switch unit is a combined switch of a triode and a diode, and the second combined switch unit is a combined switch of a diode and any one of a metal-oxide-semiconductor field effect transistor, an insulated gate bipolar transistor, a gallium nitride transistor and a silicon carbide MOS transistor.

6. The non-isolated LLC resonant converter according to claim 1, characterized in that a resonance frequency of the resonance network module (103) is:

$$fr = \frac{1}{2\pi\sqrt{LrCr}},$$

wherein Lr represents an inductance value of the resonance inductance (Lr) and Cr represents a capacitance value of the resonance capacitance (Cr).

7. The non-isolated LLC resonant converter according to claim 6, characterized in that a setting range of a switch frequency of switches in the first switch network module (101), the second switch network module (102) and the rectification network module (105) are: $0.5*fr \leq fs \leq 2*fr$.

8. The non-isolated LLC resonant converter according to claim 7, characterized in that the switch frequency of the switches in the first switch network module (101), the second switch network module (102) and the rectification network module (105) are set to: fs=fr.

9. The non-isolated LLC resonant converter according to claim 1, characterized in that the first secondary winding (Ns1_1), the second secondary winding (Ns2_1), the third secondary winding (Ns2_2) and the fourth secondary winding (Ns1_2) have the same quantity of winding turns.

10. The non-isolated LLC resonant converter according to claim 1, characterized in that when the non-isolated LLC resonant converter is operated in a resonant state, during one resonance cycle, a drive control signal PWM1 is input on the first switch (Q1), the fourth switch (Q4), the fifth switch (SR1), and the seventh switch (SR3), and a drive control signal PWM2 is input on the second switch (Q2), the third switch (Q3), the sixth switch (SR2), and the eighth switch (SR4), the drive control signal PWM1 and the drive control signal PWM2 are complementary and both have a duty ratio of 50%, and a dead time is set between the drive control signal PWM1 and the drive control signal PWM2.

* * * * *